United States Patent Office 3,761,455
Patented Sept. 25, 1973

3,761,455
METHOD FOR COAGULATING RUBBER LATEX
Takashi Tanaka, Haruhiko Yusa, and Yukihiro Ochiai, Iwaki, Japan, assignors to Kureha Kagaku Kogyo Kabushiki Kaisha, Tokyo, Japan
No Drawing. Filed Oct. 7, 1971, Ser. No. 187,518
Int. Cl. C08d 7/00
U.S. Cl. 260—85.1                               3 Claims

ABSTRACT OF THE DISCLOSURE

Coagulation of rubber latex to obtain rubber particles of desired size can be attained by alternate or simultaneous addition of acidic and alkaline substances to the latex maintained at a specific pH value.

---

This invention relates to a method for coagulating rubber latex, and, more particularly, it is directed to a method of obtaining rubber latex of industrial utility in a more advantageous manner than the known method by forming a large quantity of particulate rubber latex having sufficiently large particle size without substantially producing a rubber mass at the time of coagulation.

It has heretofore been well known to obtain rubber latex composed of rubber particles of large size by adding an acidic substance to polybutadiene latex, or a copolymer of butadiene latex, or a copolymer of butadiene and styrene so as to lower the pH value of the latex, and to coagulate the rubber particles thereby.

This method, however, is disadvantageous in that it necessitates a large amount of the acidic substance to be added to the rubber latex with a view to sufficiently lowering the pH value thereof, and to attaining sufficient coagulation of the rubber particles with the consequence that not only a part of the rubber particles coagulates to a larger size than that required to attain stable dispersion to result in a rubber mass which is industrially undesirable and is liable to lower the rate of yield of the rubber particles of the required size, but also the rubber mass adheres to the container wall to hinder the coagulating work. On the other hand, if the added quantity of the acidic substance is reduced to prevent the pH value of the rubber latex from going too low, production of the rubber mass may be restrained to some degree. However, such reduction in the added quantity does not carry out sufficient coagulation of the rubber particles, and the intended object cannot be achieved.

Heretofore, the main factor for the coagulation of rubber latex into rubber particles by addition of an acidic substance thereto has been considered to be the lowering of its stability due to lowering of the pH value of the rubber latex as a whole. However, as the results of researches conducted by the present inventors noting the aforementioned disadvantages in the known method, it has been found that the main factor for forming the coagulated particles of the rubber latex resides in neutralization of a surface activating agent added to the latex only in the region where the pH value of the latex lowers locally, which neutralization brings about fusion of the latex particles due to collision to form the coagulated particles.

It can therefore be said from the above mentioned result of studies that the pH value of the latex, i.e., whether the latex is acidic or alkaline, does not constitute any serious problem in regard to the effect of coagulation.

On the other hand, if the rubber latex as a whole is acidic, the quantity of a fatty acid soap (surface activating agent) which protects the latex particles is reduced, the rubber latex loses its stability, and hence a rubber mass is considered to be easily produced. Accordingly, it can be said that the pH value of the latex as a whole is in an important relationship with the production quantity of the rubber mass.

The present invention has been developed from the foregoing observation and research, in which an acidic substance and an alkaline substance are alternately or simultaneously added to the latex, while the pH value of the rubber latex is being maintained constantly in a neutral or alkaline state, thereby to obtain rubber particles sufficiently coagulated to a required size without substantially producing the rubber mass at the time of coagulation.

It is therefore an object of the present invention to provide an improved method of coagulating rubber latex without substantially producing an undesirable rubber mass.

It is another object of the invention to provide an effective method of producing coagulated particles of rubber latex having a required particle size by alternate addition to the rubber latex of an acidic and alkaline substances, while maintaining the pH value of the latex in a neutral or an alkaline state.

The foregoing objects as well as details of the present invention will become more apparent from the following description, when read in conjunction with the preferred examples thereof.

First of all, the rubber latex to be used in the present invention is a homopolymer of butadiene produced by radical polymerization reaction using a soap, which easily loses its surface activity by a fatty acid soap, etc., as an emulsifier, or a copolymer of butadiene and other monomer copolymerizable with butadiene in the presence or absence of divinyl compound as the cross-linking agent. To this rubber latex, an anionic surfactant which is relatively stable with respect to an acid such as, for example, dodecylbenzene sodium sulfonate, sodium salt of dioctylsulfosuccinate, etc., may be added in a small quantity as a dispersion stabilizer, depending on necessity, and sufficiently uniformly mixed with the latex. Upon complete mixing of the rubber latex and the surfactant, an acidic substance and an alkaline substance are alternately or simultaneously added to the latex, while slowly agitating the same, whereby the latex is coagulated.

A quantity of the abovementioned dispersion stabilizer to be added to the rubber latex to give a favorable result ranges from 0.02 to 0.5% by weight with respect to the rubber content in the latex. Below 0.02%, there is fair possibility of a rubber mass being yielded at the time of coagulation. Further, above 0.5% of this dispersion stabilizer results in a lowering of the effect of coagulation of the rubber particles due to the acidic substance.

For the acidic substance to be used, almost any kind of inorganic and organic acids, etc. capable of neutralizing the fatty acid soap may be used. In particular, however, a diluted aqueous solution of mineral acid such as hydrochloric acid and sulfuric acid gives a comparatively favorable result. The concentration of such acid may preferably be from 0.05 to 1.0% by weight. Below 0.05% of the acid, the coagulation effect of the rubber particles due to the acidic substance is low, and, moreover, a large quantity of the aqueous solution should be used, hence it is disadvantageous from the standpoint of industrial production. Also, when the acid quantity exceeds 1.0%, production of the rubber mass becomes prohibitive at the time of the coagulation.

For the alkaline substance, an aqueous solution of sodium hydroxide and potassium hydroxide may be used, the concentration of which may be usually between 0.1 and 10% by weight, although there is no problem as in the case of the acidic substance, even if its concentration is high. However, when the concentration is considerably low, the quantity of the solution to be used will inevitably become large, which is not desirable from the standpoint of industrial production.

At the time of adding the abovementioned aqueous solution of acidic and alkaline substances to the rubber latex either alternately or simultaneously, the pH value of the rubber latex should always be maintained in a neutral or alkaline state.

In case the acidic substance is added alternately with the alkaline substance, there is adopted a cyclic process, wherein, when the coagulation is to proceed by addition of the acidic substance, the addition is stopped prior to the pH value of the latex going below 7.0, then the alkaline substance is added to the latex to once raise its pH value, thereafter the acidic substance is again added so as to further the coagulation. In this case, the quantity of the alkaline substance plays an important role.

While the pH value of the latex may give relatively small influence on the degree of coagulation of the rubber particles, care should be taken not to raise the pH value thereof unnecessarily high, because, if the value is extremely high, the coagulation effect due to the acidic substance is inevitably lowered to a certain degree. It is therefore preferable that the pH value of the rubber latex after the alkaline substance is added be within a range of from 8.0 to 11.0.

In the case of simultaneous addition of both acidic and alkaline substances, it is imperative that the rate of addition of these substances be controlled with great care so as to maintain the pH value of the latex in a neutral or alkaline state. As is the case with the alternate addition of these substances, the pH value of the latex may preferably be maintained constantly between 7.0 and 11.0. Needless to say, care should be taken not to mix the acidic and alkaline substances together before they are added to the latex. They are readily neutralized.

The rubber latex, on which the above-described coagulation is completed, should preferably be maintained at its final pH value of from 8.0 to 12.0 in order not to lose its stability.

The coagulated rubber particles manufactured by the method of this invention may be used for production of foamed elastic articles such as foam rubber, by concentration, or production of impact modifiers for polyvinyl chloride, polystyrene, copolymer of styrene and methyl methacrylate, polymers of the acrylonitrile series, and so forth by graft-polymerizing one or more kinds of styrene, acrylonitrile, methylmethacrylate onto this latex.

EXAMPLE 1

1,300 g. of butadiene monomer containing therein 26 g. of diisopropyl benzene hydroperoxide, and 3,500 g. of distilled water containing therein 5 g. of potassium oleate, 0.13 g. of ethylene diamine tetra-acetic disodium salt, 13 g. of sodium formaldehyde sulphoxylate, 0.08 g. of $FeSO_4 \cdot 7H_2O$, and 40 g. of $Na_4P_2O_7 \cdot 10H_2O$ were charged into a stainless steel autoclave of 10-liter capacity with agitator under the vacuum condition, and the batch was reacted at a temperature of 45° C. for 15 hours until no further pressure decrease was recognized, whereby rubber latex of a solid content of 27%, and pH value of 8.9 was obtained at the polymerization yield of 98%.

This rubber latex appeared to have fairly good transparency, and, as a result of examination through an electron microscope, it was found to have an average latex particle size of approximately 800 angstroms.

To this rubber latex, 65 g. of 2% aqueous solution of sodium salt of dioctyl ester sulfosuccinate was added, and both were well mixed by agitation for 10 minutes. Thereafter, 0.2% aqueous solution of hydrochloric acid was gradually added to the latex, while it is being gently agitated, to lower its pH value as low as 7.0, and then 1% aqueous solution of caustic soda was added to this latex to again raise the pH value to 9.0.

This raising and lowering of the pH value of the rubber latex between 9.0 and 7.0 was repeated for 10 times by alternate addition of 0.2% aqueous solution of hydrochloric acid and 1% aqueous solution of caustic soda.

The resulted latex was turbid and white, giving no transparency at all. Through the electron microscope, it was found that the latex particles, augmented to a size of larger than 2,000 angstroms, occupied about 60% of the entire latex particles, and those which were not coagulated at all amounted to approximately 10%.

At the termination of the rubber polymerization, there was found that some amount of rubber mass adhered to the inner wall of the autoclave as well as the agitation blades. Upon completion of the coagulation, however, such adhered mass of rubber could hardly be observed. Also, the amount of rubber mass which is floating in the rubber latex and is regarded as the deposited substance at the time of coagulation was approximately 0.1 g., which was less than 0.01% with respect to the total rubber content.

EXAMPLE 2

Butadiene-styrene copolymer latex was produced in the same procedure as in Example 1 above by using a monomer mixture consisting of 1,000 g. of butadiene, 300 g. of styrene, and 1.3 g. of divinyl benzene. The rubber latex had a pH value of 8.7.

To 1,000 g. of this latex (rubber content of about 270 g.), 13.5 g. of 2% aqueous solution of dodecyl benzene sodium sulfonate was added and sufficiently mixed, after which 270 ml. of 0.3% aqueous solution of hydrochloric acid and 25 ml. of 2% aqueous solution of caustic soda were added to the latex through two nozzles at a feeding rate of 13 ml./min. and 1.2 ml./min., respectively, while agitating the latex. The pH value of the latex during this addition was constantly kept between 8.4 and 9.1.

At the termination of the coagulation operation the mass of rubber thus produced was 0.03 g., which was approximately 0.01% with respect to the total rubber content. To this latex, a monomer mixture consisting of 40 g. of styrene and 35 g. of methyl-methacrylate containing therein 0.7 g. of diisopropyl benzene hydroperoxide and 0.3 g. of divinyl benzene, and 10 g. of distilled water containing therein 0.35 g. of sodium formaldehyde sulphoxylate were added, and the batch was reacted for 4 hours at 60° C. Further, 10 g. of distilled water containing therein 0.01 g. of sodium formaldehyde sulphoxylate, and 20 g. of methyl methacrylate containing therein 0.02 g. of diisopropyl benzene and 0.1 g. of divinyl benzene were added, and the reaction was continued for an additional 7 hours at 60° C.

When the latex thus produced was subjected to acid precipitation, dehydration, and drying, a graft-copolymer was obtained as a white powder.

13 parts by weight of this graft-copolymer and 87 parts by weight of polyvinyl chloride were mixed and kneaded in a roll maintained at 170° C. for 5 minutes, and then press-formed into a plate 6 mm. thick in a press machine heated to 200° C. for 10 minutes. This plate showed the V-notch Izod strength of 80 kg.-cm./cm.$^2$.

EXAMPLE 3 (COMPARISON)

In the above Example 2, the graft polymerization was conducted without the rubber latex being coagulated.

The V-notch Izod strength of the sample plate obtained from such graft copolymer was 20 kg.-cm./cm.$^2$.

EXAMPLE 4 (COMPARISON)

270 ml. of 0.3% aqueous solution of hydrochloric acid was added to 1,000 g. of uncoagulated rubber latex, which is the same as that obtained in Example 2 above, in accordance with the known method of coagulation. The pH value of the latex lowered to 4.0, and 105 g. of rubber mass was produced (about 3.9% with respect to the total rubber content).

To this rubber latex, 25 ml. of 20% aqueous solution of caustic soda was added to raise the pH value thereof to 9.1, after which methyl methacrylate was grafted on this rubber latex in the same manner as in Example 2 above to obtain a butadiene-styrene-methyl methacrylate copolymer.

This graft copolymer was added to polyvinyl chloride at a rate of 13% by weight with respect to the total quantity of the blend, and then press-formed into a plate 6 mm. thick. The Izod impact strength of this plate was 82 kg.-cm./cm.$^2$.

As will be observed from the foregoing examples, when the latex is not coagulated, the impact-strength-imparting effect of the graft copolymer to the polyvinyl chloride is not so remarkable. Even when the latex is coagulated, if it is done by using an acid alone as has heretofore been practiced, there inevitably are various problems in the rate of yield of the rubber mass from the coagulation as well as operational troubles, although the impact strength imparting effect of the graft polymer may increase.

However, when the coagulation of the rubber latex is carried out in accordance with Examples 1 and 2 of the present invention, production of the rubber mass can be reduced to the minimum, and effective coagulation of the latex can be achieved. The impact-resistance-imparting effect of the graft polymer thus obtained by using such coagulated latex is also satisfactory.

1. A method for preparing a coagulated rubber latex which comprises preparing a rubber latex from a material selected from the group consisting of polybutadiene and copolymers of butadiene and styrene using a fatty acid soap as emulsifier, adding to the latex an anionic surface active agent selected from the group consisting of dodecylbenezne sodium sulfonate and sodium salt of dioctyl ester sulfosuccinate as a dispersion stabilizer in an amount of from 0.02 to 0.5% by weight with respect to the rubber component in the latex and adding to the resultant mixture an acidic substance selected from the group consisting of hydrochloric acid and sulfuric acid in dilute aqueous solution in a concentration ranging from 0.05 to 1.0% by weight and an alkaline substance selected from the group consisting of sodium hydroxide and potassium hydroxide in aqueous solution in a concentration ranging from 0.1 to 10% by weight, while maintaining the pH of the rubber latex at a value ranging from 7.0 to 11.0 and uniformly mixing the latex and acidic and alkaline substances by means of stirring to sufficiently disperse the substances into the latex.

2. The method according to claim 1, in which said acidic and alkaline substances are added to said rubber latex alternately.

3. The method according to claim 1, in which said acidic and alkaline substances are added to said rubber latex simultaneously.

References Cited

UNITED STATES PATENTS 3,024,223    3/1962    Klapper _____ 260—85.1
3,483,174   12/1969   Libengood et al. ____ 260—83.5

OTHER REFERENCES

O. G. Defensive Publication; Schmidt et al. of Ser. No. 31,860 filed May 1, 1970, published in 883 O.G. 11 on Feb. 2, 1971, No. T883,012.

JOSEPH L. SCHOFER, Primary Examiner

W. F. HAMROCK, Assistant Examiner

U.S. Cl. X.R.

260—94.7 R, 821, 96 R

UNITED STATES PATENT OFFICE
CERTIFICATE OF CORRECTION

Patent No. 3,761,455          Dated September 25, 1973

Inventor(s) Takashi Tanaka, Haruhiko Yusa, and Yukihiro Ochiai

It is certified that error appears in the above-identified patent and that said Letters Patent are hereby corrected as shown below:

Page one, first column, below the line reading "No Drawing. Filed Oct. 7, 1971, Ser. No. 187,518", insert the following:

-- Claims priority, application Japan, October 8, 1970, 88695/70 --.

Signed and sealed this 12th day of March 1974.

(SEAL)
Attest:

EDWARD M. FLETCHER, JR.                C. MARSHALL DANN
Attesting Officer                      Commissioner of Patents